(12) United States Patent
Angelo et al.

(10) Patent No.: US 10,493,837 B1
(45) Date of Patent: Dec. 3, 2019

(54) CHASSIS MOUNTED ASSEMBLIES FOR ELECTRIC OR HYBRID VEHICLES

(71) Applicants: Gerald Jay Angelo, Bellevue, WA (US); Benjamin D. Speirs, Kirkland, WA (US)

(72) Inventors: Gerald Jay Angelo, Bellevue, WA (US); Benjamin D. Speirs, Kirkland, WA (US)

(73) Assignee: PACCAR Inc, Bellevue, WA (US)

( * ) Notice: Subject to any disclaimer, the term of this patent is extended or adjusted under 35 U.S.C. 154(b) by 0 days.

(21) Appl. No.: 16/158,015

(22) Filed: Oct. 11, 2018

(51) Int. Cl.
| | | |
|---|---|---|
| *B60K 1/04* | (2019.01) | |
| *B60K 6/28* | (2007.10) | |
| *B60K 6/46* | (2007.10) | |
| *B60K 6/48* | (2007.10) | |
| *B62D 21/03* | (2006.01) | |
| *B60L 50/60* | (2019.01) | |
| *B60L 50/71* | (2019.01) | |

(52) U.S. Cl.
CPC .................. *B60K 6/28* (2013.01); *B60K 1/04* (2013.01); *B60K 6/46* (2013.01); *B60K 6/48* (2013.01); *B60L 50/66* (2019.02); *B60L 50/71* (2019.02); *B62D 21/03* (2013.01); *B60K 2001/0438* (2013.01); *B60Y 2200/14* (2013.01); *B60Y 2200/91* (2013.01); *B60Y 2200/92* (2013.01)

(58) Field of Classification Search
CPC ... B60K 6/28; B60K 6/46; B60K 6/48; B60K 2001/0438; B62D 21/03; B60L 11/1877; B60Y 2200/14; B60Y 2200/91
See application file for complete search history.

(56) References Cited

U.S. PATENT DOCUMENTS

| | | |
|---|---|---|
| 4,317,497 A | 3/1982 | Alt et al. |
| 4,408,792 A | 10/1983 | Sullivan |
| D395,848 S | 7/1998 | Meryman et al. |
| D411,140 S | 6/1999 | Meryman et al. |

(Continued)

FOREIGN PATENT DOCUMENTS

| | | |
|---|---|---|
| AU | 312597 | 1/2007 |
| AU | 312598 | 1/2007 |

(Continued)

OTHER PUBLICATIONS

"Zero-Emission Kenworth T680 Equipped with Hydrogen Fuel Cell on Display at Consumer Electronics Show", Kenworth Truck Company News Release, Jan. 9, 2018, 1 page.

*Primary Examiner* — James A Shriver, II
*Assistant Examiner* — James J Triggs
(74) *Attorney, Agent, or Firm* — Christensen O'Connor Johnson Kindness PLLC

(57) ABSTRACT

In an embodiment, a hybrid or electric truck includes a chassis including first and second rails and a plurality of cross members extending between the first and second rails, a component including first and second portions, and a support structure including first, second, and third support structures. The component extends substantially across a width of the truck. The first support structure is configured to support the first portion and attach to the first rail. The second support structure is configured to support the second portion and attach to the second rail. The third support structure is attached to a cross member of the plurality of cross members and at least one of the first or second portions.

20 Claims, 14 Drawing Sheets

(56) References Cited

U.S. PATENT DOCUMENTS

| | | |
|---|---|---|
| 5,947,520 A | 9/1999 | McHorse |
| D433,967 S | 11/2000 | Delashaw et al. |
| D434,348 S | 11/2000 | Delashaw et al. |
| 6,454,035 B1 | 9/2002 | Waskow et al. |
| D491,508 S | 6/2004 | Perfetti et al. |
| D496,620 S | 9/2004 | Perfetti et al. |
| D522,426 S | 6/2006 | Beigel et al. |
| D524,202 S | 7/2006 | Devitt |
| D531,946 S | 11/2006 | Angelo et al. |
| D531,948 S | 11/2006 | Angelo et al. |
| D532,731 S | 11/2006 | Angelo et al. |
| D549,144 S | 8/2007 | Elliott et al. |
| D558,643 S | 1/2008 | Beigel et al. |
| D566,639 S | 4/2008 | Elliott et al. |
| 7,641,254 B2 | 1/2010 | Stegawski et al. |
| D628,134 S | 11/2010 | Salnick et al. |
| D646,613 S | 10/2011 | Medina et al. |
| D647,019 S | 10/2011 | Medina et al. |
| 8,051,934 B2 * | 11/2011 | Kiya ............... B60K 1/04 180/274 |
| D660,756 S | 5/2012 | Peltola et al. |
| D685,294 S | 7/2013 | Hanson et al. |
| 8,506,004 B1 | 8/2013 | Vogel et al. |
| 8,616,319 B2 * | 12/2013 | Yokoyama ............... B60K 1/04 180/68.5 |
| D707,606 S | 6/2014 | Leetz et al. |
| D707,607 S | 6/2014 | Leetz et al. |
| D708,105 S | 7/2014 | Leetz et al. |
| D708,106 S | 7/2014 | Jensen et al. |
| D708,107 S | 7/2014 | Jensen et al. |
| 8,778,527 B2 | 7/2014 | Lee |
| D716,211 S | 10/2014 | Jensen et al. |
| 9,283,838 B2 * | 3/2016 | Ohashi ............... B60K 1/04 |
| D753,039 S | 4/2016 | Duncan et al. |
| D786,762 S | 5/2017 | Smith et al. |
| 9,636,984 B1 * | 5/2017 | Baccouche ............. B60R 16/04 |
| 9,776,665 B2 * | 10/2017 | Garay Serrano .... B62D 21/157 |
| 2009/0000841 A1 | 1/2009 | Reed et al. |
| 2012/0103714 A1 | 5/2012 | Choi et al. |
| 2014/0141288 A1 | 5/2014 | Kim et al. |

FOREIGN PATENT DOCUMENTS

| | | |
|---|---|---|
| AU | 312599 | 1/2007 |
| CA | 112569 S | 3/2008 |
| CA | 112571 S | 3/2008 |
| CA | 112572 S | 3/2008 |
| CA | 2576649 A1 | 8/2008 |
| CN | 103863080 A | 6/2014 |
| DE | 10 2012 109 062 A1 | 3/2014 |
| MX | 21924 | 11/2006 |
| MX | 21925 | 11/2006 |
| MX | 21926 | 11/2006 |
| MX | 283975 | 2/2011 |

* cited by examiner

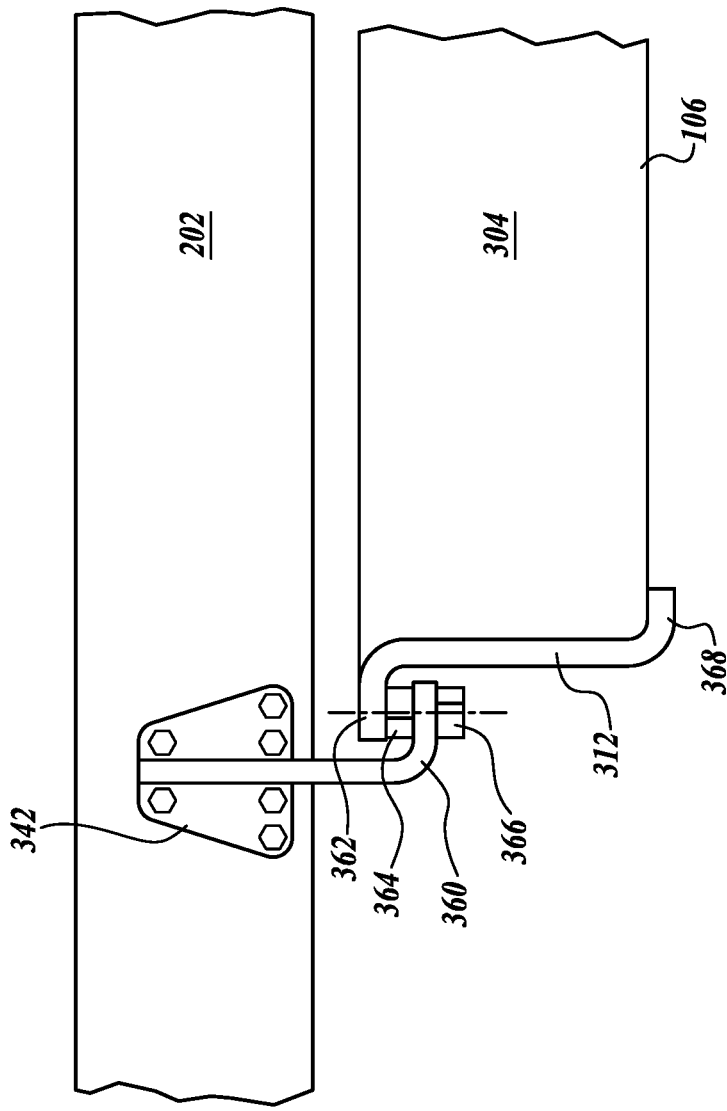

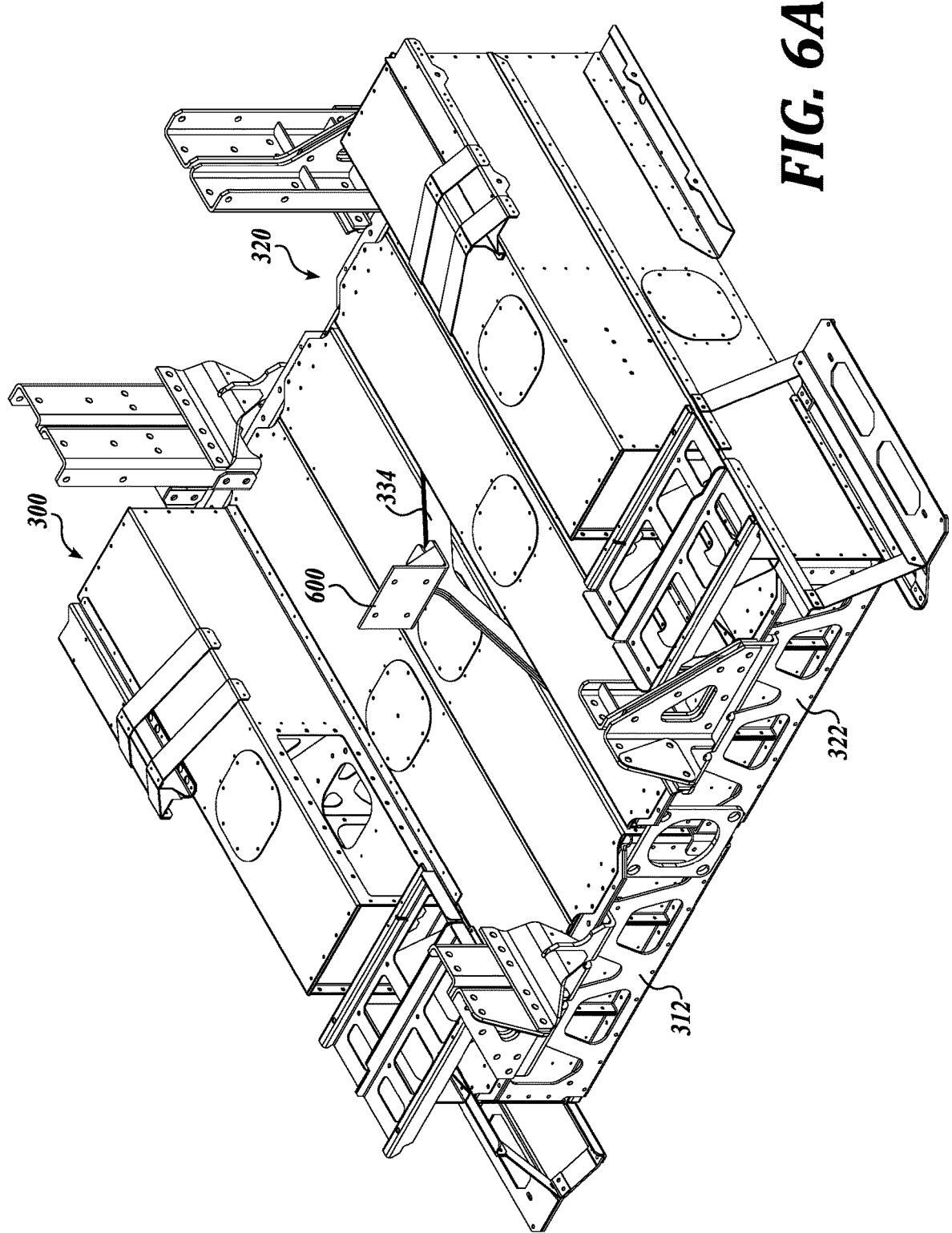

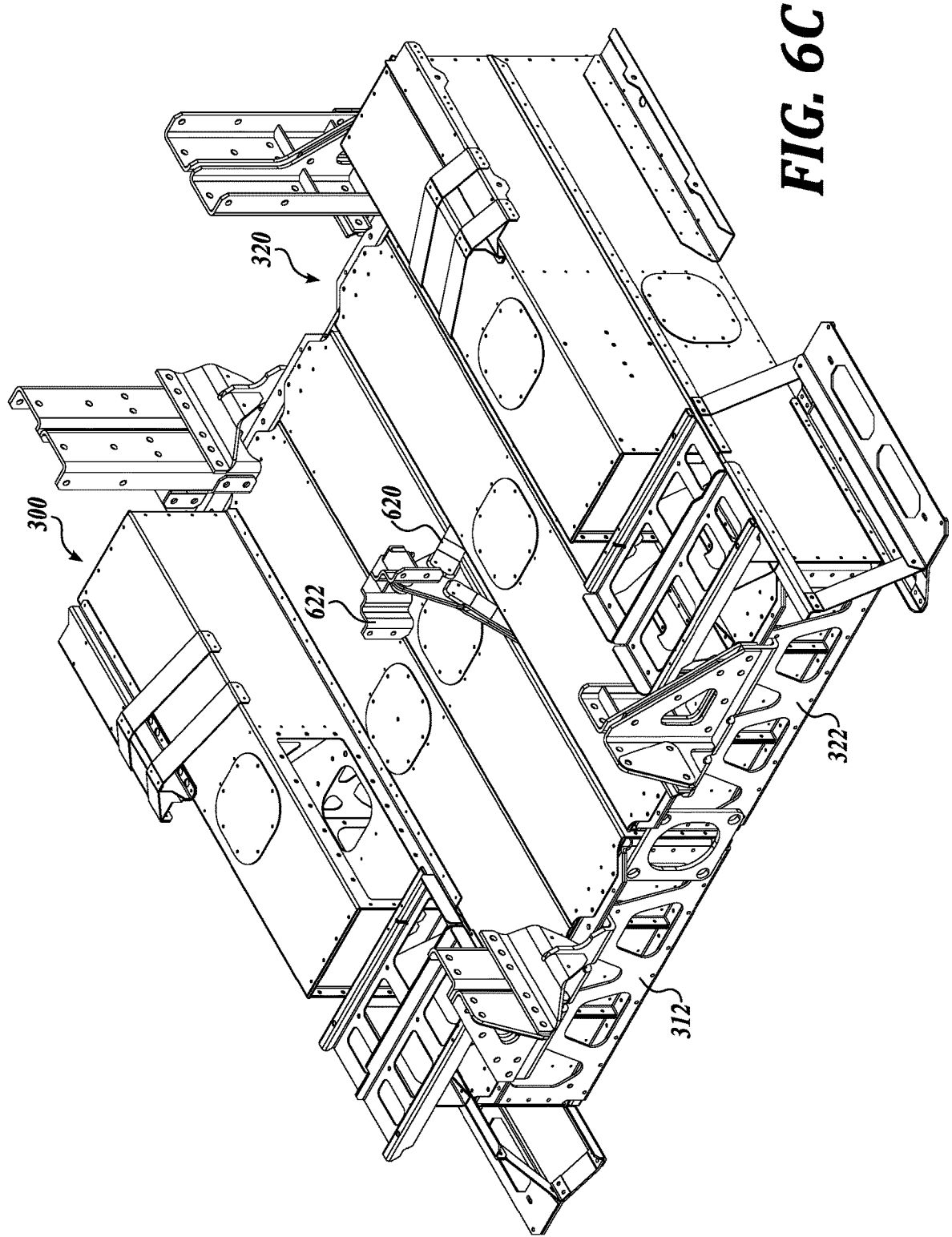

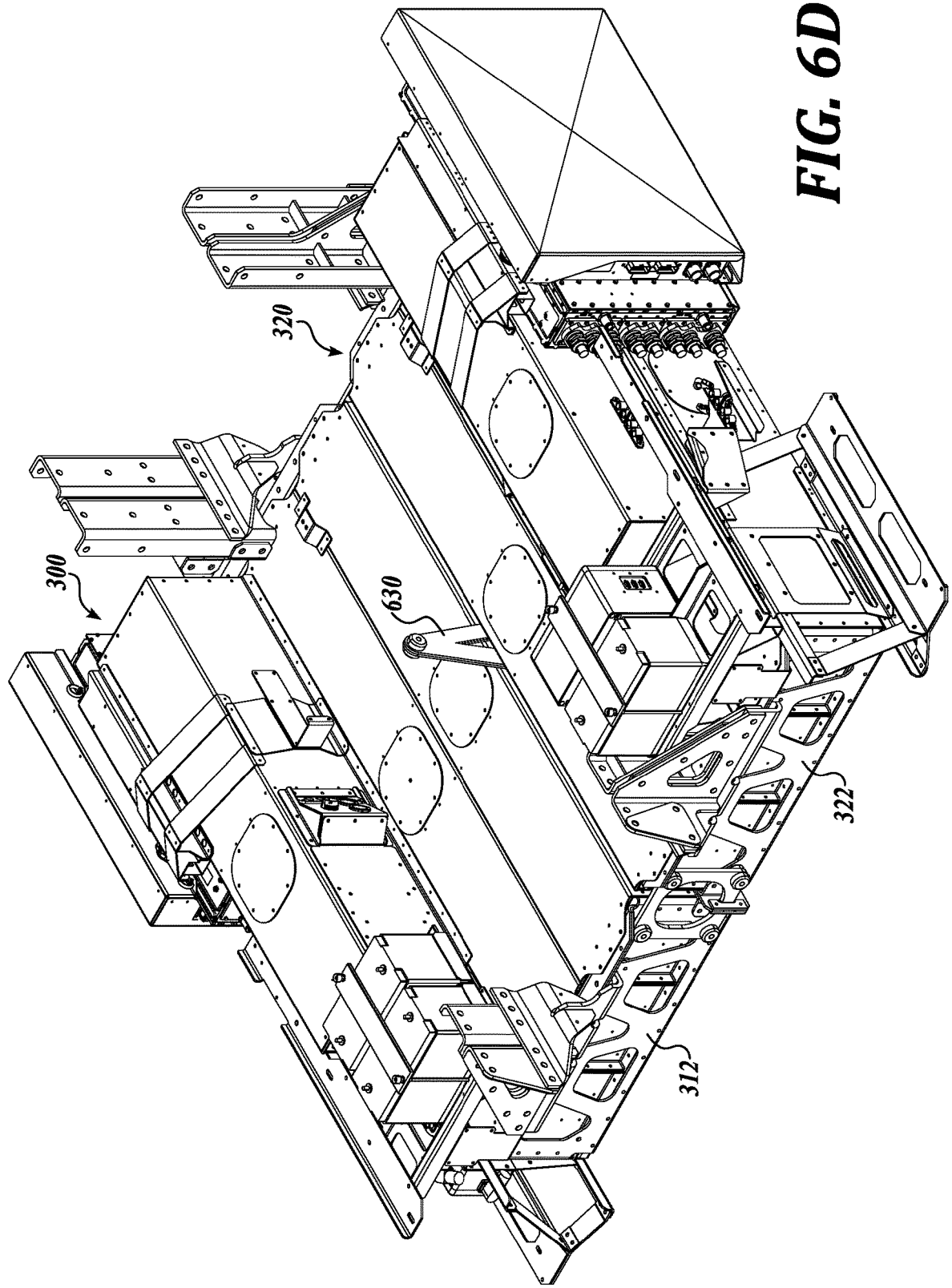

CHASSIS MOUNTED ASSEMBLIES FOR ELECTRIC OR HYBRID VEHICLES

BACKGROUND

Commercial electric or hybrid vehicles, such as Class 6-8 trucks with electric or hybrid powertrains, have considerable battery requirements. Given the large number of batteries included in such commercial vehicles, the placement of the batteries is not a trivial matter. Weight distribution, non-interference with other components, and/or other factors is also relevant for batteries that are used to store electrical energy used by electric or hybrid powertrains.

In some instances, the chassis of a large commercial vehicle may be configured to be flexible in torsion. Chassis flexibility, among other things, allows the vehicle to maneuver over uneven terrain while keeping the tires in contact with the ground for stability and traction. When components such as battery storage systems are mounted on a chassis that is flexible in torsion, the battery storage system is also subject to movement originating from the chassis. Such movement or flexing of the battery storage system is undesirable. The batteries and/or the structures holding the batteries subject to movement or flexing originating from the chassis may experience, among other things, performance deterioration, component deterioration, component failure, or possibly electrical discharge, and in extreme circumstances, cause a fire and/or explode. While the batteries may be replaced well ahead of its rated end of useful life to address premature wear and tear associated with movements originating from the chassis, the high cost of premature replacement is cost prohibitive. Frequent service and battery replacement also may not eliminate possible performance issues or fire or explosive hazards that would be present while mounted to the chassis.

Accordingly, it is desirable for a component, such as a battery storage system, mounted on a chassis to be configured to address undesirable movement or flexibility of the chassis.

SUMMARY

This summary is provided to introduce a selection of concepts in a simplified form that are further described below in the Detailed Description. This summary is not intended to identify key features of the claimed subject matter.

In some embodiments, a component assembly of a vehicle having a chassis includes a component configured to extend substantially across a width of the vehicle, wherein the chassis is configured to be flexible in the presence of a torsion force, and a support structure including a plurality of brackets, wherein each bracket of the plurality of brackets is configured to hold the component and secure the component to the chassis, wherein the support structure is configured to maintain the component at a higher rigidity than the chassis in the presence of the torsion force.

In some embodiments, a hybrid or electric truck includes a chassis including first and second rails and a plurality of cross members extending between the first and second rails; a component including first and second portions, wherein the component extends substantially across a width of the truck; and a support structure including first, second, and third support structures, wherein the first support structure is configured to support the first portion and attach to the first rail, the second support structure is configured to support the second portion and attach to the second rail, and the third support structure is attached to a cross member of the plurality of cross members and at least one of the first or second portions.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

FIGS. 3A-3C depict top perspective, bottom perspective, and partial side views, respectively, of a battery assembly in accordance with some embodiments of the present disclosure;

FIGS. 6A-6D depict perspective views of various hangers and mounting brackets associated with hangers in accordance with some embodiments of the present disclosure;

DETAILED DESCRIPTION

Embodiments of a system and apparatus for rigid component assemblies mounted to a vehicle chassis are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
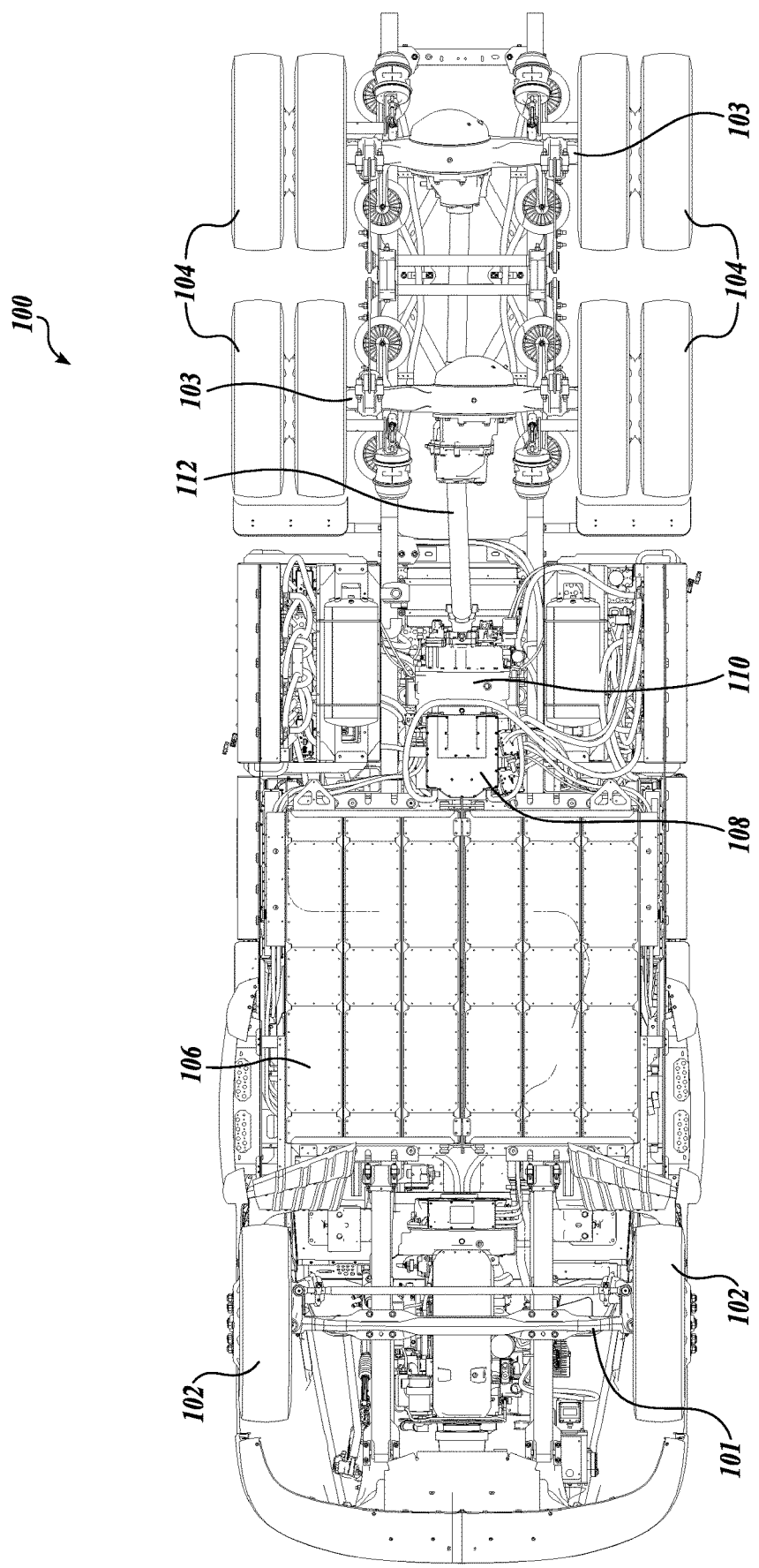
FIG. 1 depicts a bottom view of an example vehicle in accordance with some embodiments of the present disclosure.

FIG. 1 depicts a bottom view of an example vehicle 100 in accordance with some embodiments of the present disclosure. Vehicle 100 comprises, without limitation, a Class 6-8 truck, a truck including an electric or hybrid powertrain, an electric truck, a hybrid truck, a class of vehicle other than Class 6-8, a commercial vehicle, a vehicle including batteries capable of powering at least a portion of a drive shaft of the vehicle, and/or the like.

At opposing ends of vehicle 100 are located a front axle 101 and rear axles 103, each of which extends across the width of the vehicle 100. To the ends of the front axle 101 are mounted front wheels or tires 102, and to the ends of the rear axles 103 are mounted rear wheels or tires 104. In some embodiments, vehicle 100 includes a battery assembly 106 located approximately below the cab area (e.g., under the cab area and behind the chassis fairing). Battery assembly 106 extends across (or substantially across) the width of the vehicle 100 below the chassis frame rails, as will be described in detail below. Battery assembly 106 is configured in an underslung hinged configuration. Battery assembly 106, also referred to as rechargeable batteries, battery packs, or the like, comprises a component capable of storing electrical energy and using the electrical energy to drive or power at least a portion of a drive shaft 112 of the vehicle 100.

In some embodiments, vehicle 100 may comprise a serial hybrid vehicle that includes at least one power source, such as an internal combustion engine (ICE) or turbine, coupled to an electric generator. The power source drives the electric generator to generate electrical energy (or in the case of a fuel cell, for example, the power source may generate electricity directly), which is stored in the battery assembly 106. The electrical energy stored in the battery assembly 106 is used to power a traction motor 108. Traction motor 108 may comprise one or more motors. A transmission 110, disposed between the traction motor 108 and the drive shaft 112, is configured to receive torque produced by the traction motion 108. The output of the transmission 110 powers the drive shaft 112, and the drive shaft 112, in turn, powers the rear axles 103 (and wheels 104). Wheels 104 are, thus, not mechanically coupled directly to the power source. Instead, wheels 104 are deemed to be electrically coupled or indirectly coupled to the power source. Such implementation is also referred to as a serial hybrid configuration.

Although not shown, vehicle 100 further includes a plurality of other components such as, but not limited to, a chassis, charger, control system, fuel tank, compressor, cooling system, and/or the like.

Figure 2:
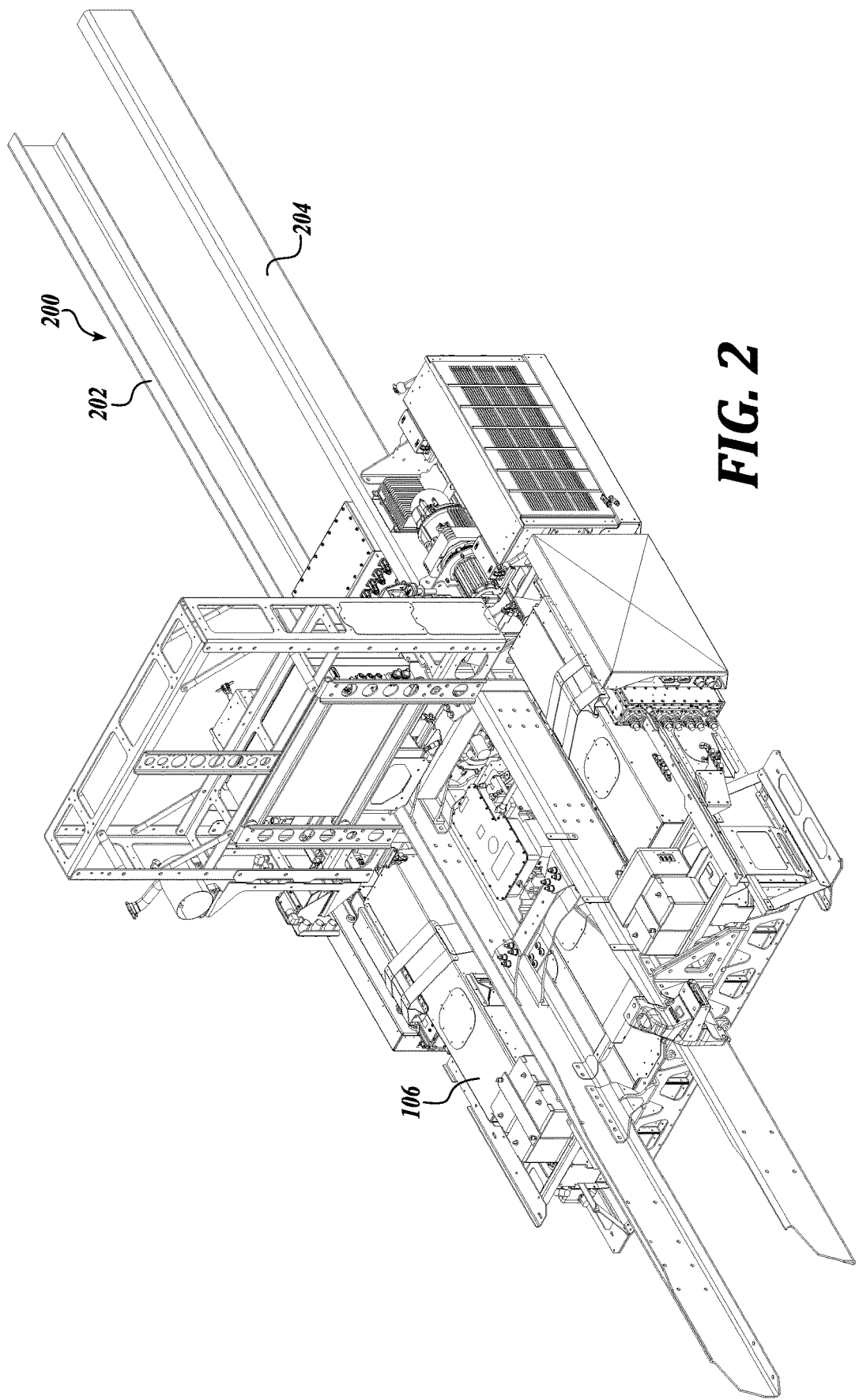
FIG. 2 depicts a top perspective view of a portion of the vehicle of FIG. 1 in accordance with some embodiments of the present disclosure.

FIG. 2 depicts a top perspective view of a portion of the vehicle 100 in accordance with some embodiments of the present disclosure. At least a portion of a chassis 200 included in the vehicle 100 is shown along with the battery assembly 106. Chassis 200 comprises a frame or frame assembly of the vehicle 100, and includes rails 202, 204 spaced apart from each other and extending along the length (or substantially the length) of the vehicle 100. In some embodiments, rails 202, 204 are co-planar and parallel to each other. Each of rails 202, 204 may comprise an I-beam, C-beam, or the like. Battery assembly 106 is configured to physically couple to chassis 200. FIG. 2 shows battery assembly 106 positioned to mount to chassis 200 from the underside. The width of battery assembly 106 is larger than the distance between the rails 202, 204. As will be described below, battery assembly 106 mechanically couples to each of the rails 202, 204 and also to a lateral or cross member of the chassis 200 that extends perpendicularly between the rails 202, 204.

Figure 3A:
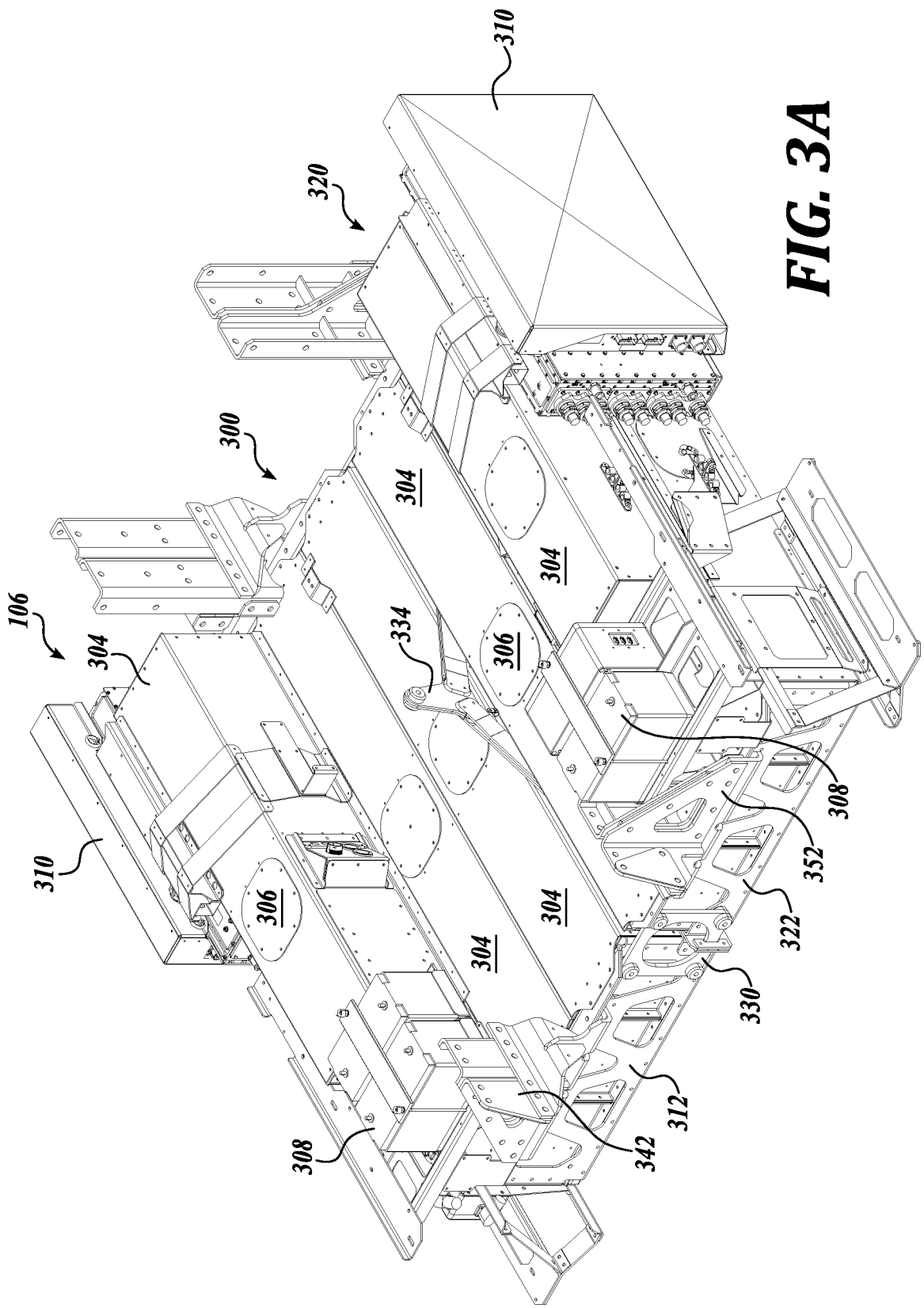
Figure 3B:
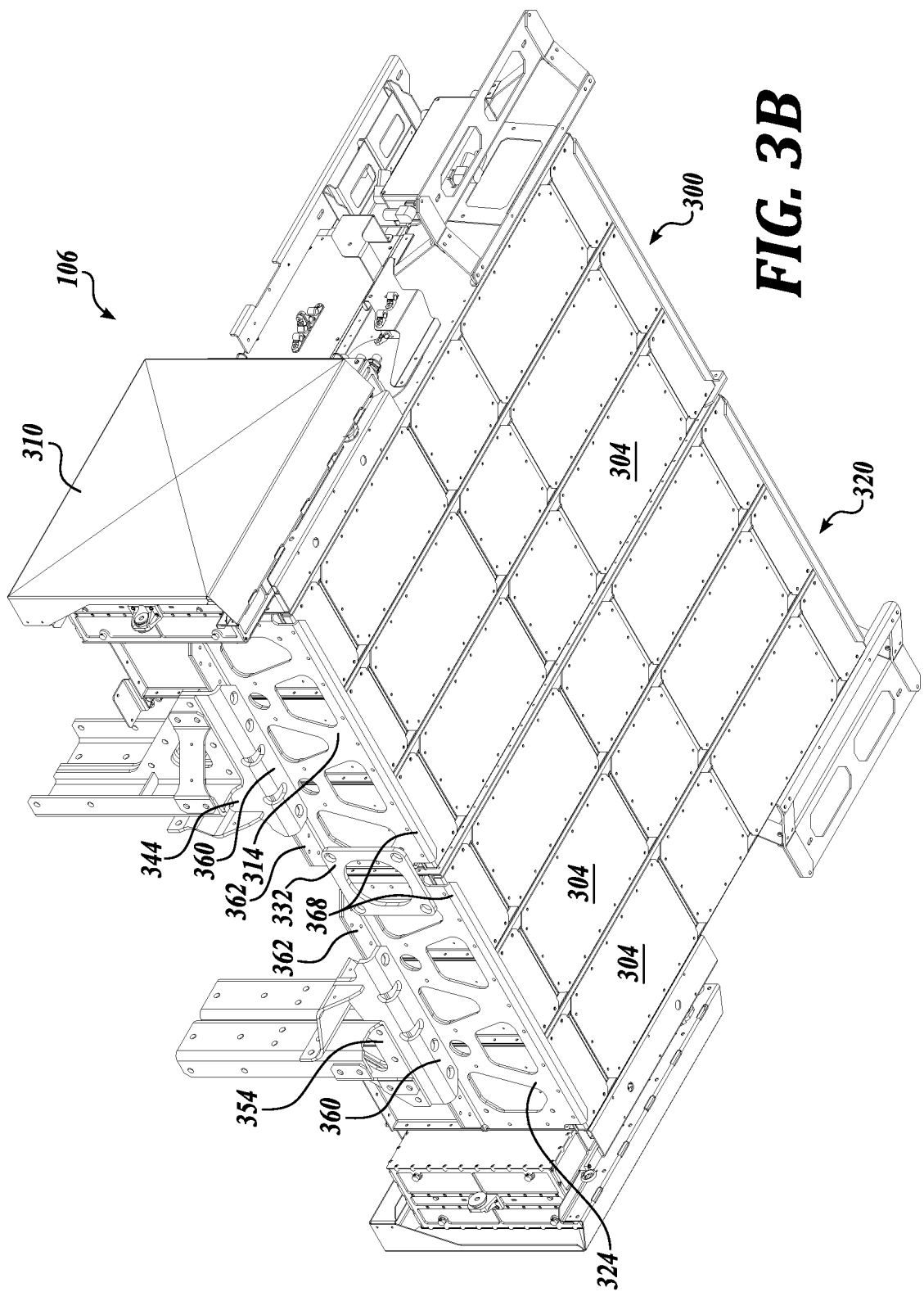

FIGS. 3A-3C depict top perspective, bottom perspective, and partial side views, respectively, of the battery assembly 106 in accordance with some embodiments of the present disclosure. In some embodiments, battery assembly 106 comprises first and second battery subassemblies 300, 320 (also referred to as left and right battery subassemblies or a pair of battery housing assemblies (BHAs)) along with associated stiffening and/or mounting components. First and second battery subassemblies 300, 320 may be identical or substantially identical to each other, symmetrical or mirrored along a center line extending along the length of the vehicle 100.

First battery subassembly 300 comprises a plurality of batteries housed within a plurality of battery housings 304, a low voltage battery 308, a battery control module (not shown), a control electronics module 310, a pair of brackets 312, 314, and associated operational components (e.g., coolant lines, cables, control logic, electrical coupling lines, electrical connectors, etc.).

Figure 4:
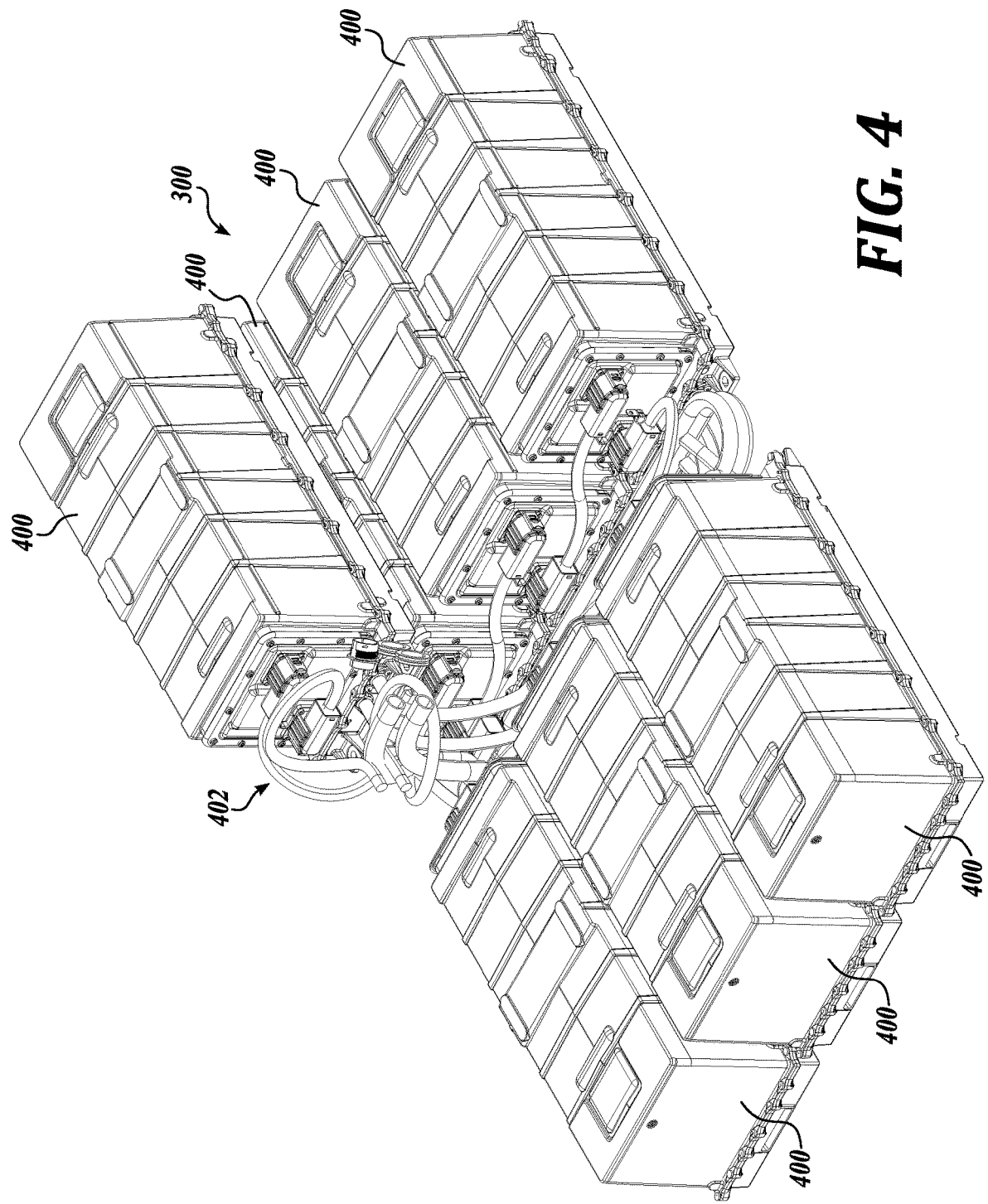
FIG. 4 depicts example battery subpacks of a first battery subassembly of the battery assembly of FIGS. 3A-3C in accordance with some embodiments of the present disclosure.

The plurality of batteries included in the battery housings 304 comprise rechargeable batteries such as, but not limited to, lithium ion batteries. Each battery of the plurality of batteries may itself comprise one or more batteries. Each battery of the plurality of batteries is also referred to as a battery subpack. In some embodiments, three rows of battery housings 304 are provided on a first layer (the layer closest to mounting brackets 312, 314), and one row of battery housing 304 is provided on a second layer disposed over the first layer and furthest from the center line of the vehicle 100. The particular battery housing 304 that is stacked over a battery housing 304 in the first layer (also referred to as the stacked battery housing, shown on the left side of FIG. 3A) may include a fewer number of batteries than the number of batteries in each of the remaining battery housings 304 of the first battery subassembly 300. The stacked battery housing 304 may also include components such as the battery control module. The stacked battery housing 304 may be shorter in longitudinal length than the other battery housings 304 of the first battery subassembly 300, the remaining space to be occupied by the low voltage battery 308. FIG. 4 shows an example of the seven battery subpacks 400 of the first battery subassembly 300, arranged the same as in FIG. 3A with the four battery housings 304 omitted.

As shown in FIG. 4, battery subpacks 400 associated with a given battery housing 304 are coupled to one or more cables, coolant lines, control logic, electrical couplings, and/or the like (collectively referred to as operational couplings 402). The operational couplings 402 can be accessed via an access panel 306 included on each of the battery housings 304 (see FIG. 3A). In some embodiments, each of the battery housings 304 may comprise a square tube, rectangular tube, longitudinal box beam structure, or the like. The plurality of battery housings 304 of the first battery subassembly 300 are interconnected with each other. In some embodiments, each of the battery housings 304 and/or battery subpack 400 may be swapped in or out independently of each other.

In some embodiments, four sides of the first battery subassembly 300 are bordered and secured to one or more components. A first side of the first battery subassembly 300 closest to the front of the vehicle 100 is bordered by and secured to bracket 312. The first side, also referred to as the fore side or end, comprises one set of longitudinal ends of the battery housings 304 located in the first layer. A second side of the first battery subassembly 320, adjacent to the first side and on an outboard side of the vehicle 100, is bordered by and/or secured to a beam, bracket, control electronics module 310, and/or the like. The second side is also referred to as an outboard side or left outboard side. A third side of the first battery subassembly 300, opposite to the first side and on the aft side or end of the vehicle 100, is bordered by and secured to bracket 314. The third side, also referred to as the aft side or end, comprises the set of longitudinal ends of the battery housings 304 located in the first layer that are opposite to the longitudinal ends comprising the first side. A fourth side of the first battery subassembly 300, opposite to the second side and on an inboard side of the vehicle 100, is bordered by and secured to hangers 334. The fourth side is also referred to as an inboard side or left inboard side.

Second battery subassembly 320 is similar to the first battery subassembly 300 except configured to be symmetrical to the first battery subassembly 320 about the (imaginary) central line extending along the length of the vehicle 100 and including brackets 322, 324 in place of brackets 312, 314, respectively. In some embodiments, the plurality of battery housings 304 of the first and second battery subassemblies 300, 320 are collectively bordered on four sides by a frame like structure. The frame like structure may resemble a bottomless tray (see FIG. 3B). The batteries included in the first and second battery subassemblies 300, 320 (e.g., a total of 14 battery subpacks 400) are electrically coupled to each other. As an example, the first and second battery subassemblies 300, 320 combined may have a capacity of approximately 100 kiloWatt hour (kWh), 650 Volts (V), or the like.

In some embodiments, brackets 312 and 314 respectively located at the fore/front and aft/back of the first battery subassembly 300 are configured to couple with respective frame brackets 342, 344 (as shown in FIGS. 3A and 3B). Frame bracket 342 is configured to attach to rail 202 and include an inward facing support flange at the bottom edge (e.g., inward facing toward the first battery subassembly 300). Bracket 312 is configured to attach to the fore/front end of the plurality of battery housings 304 located at the first layer of the first battery subassembly 300, and include an outward facing flange at the top edge (e.g., outward facing away from the first battery subassembly 300) and an inward facing support flange at the bottom edge (e.g., inward facing toward the first battery subassembly 300). The outward facing flange at the top edge of the bracket 312 aligns with and is positioned above the inward facing support flange of the frame bracket 342, so that the frame bracket 342 supports at least the fore/front side of the first battery subassembly 300. One or more bushings are included in between the flanges of the frame bracket 342 and bracket 312.

FIG. 3C depicts a partial side view of the vehicle 100 illustrating an example coupling between the frame bracket 342 and bracket 312. As shown, an upper portion of the frame bracket 342 is attached, secured, connected, mounted, welded, bolted, or the like to an outboard side of the rail 202. The bottom edge or portion of the frame bracket 342 includes an inward facing support flange 360. Bracket 312, which is attached, secured, connected, mounted, or the like to one end of the battery housings 304, includes an outward facing flange 362 at the top edge/portion and an inward facing support flange 368 at the bottom edge/portion. The inward facing support flange 368 may be configured to support or hold the plurality of battery housings 304. Outward facing flange 362 is aligned with and disposed above the inward facing support flange 360. In between flanges 362 and 360 is a bushing 364. A bushing 366 may also be provided below flange 360. The sandwich or stack formed by the flange 362, bushing 364, flange 360, and bushing 366 are coupled together using a securing mechanism such as, but not limited to, nuts and bolts (not shown) or the like.

Bracket 314 and frame bracket 344 are similarly shaped and coupled relative to each other on the aft/back side of the first battery subassembly 300. Alternatively, the flange direction may be reversed from those described above at a single end or both ends of one or more of bracket 312, bracket 314, frame bracket 342, and frame bracket 344.

Frame brackets 342, 344 and brackets 312, 314 may comprise metallic materials such as, but not limited to, steel, a material having a stiffness or rigidity in the range of 200 Gigapascal (GPa), and/or the like. One or more of frame brackets 342, 344 and brackets 312, 314 may include one or more cutout portions to reduce material and/or weight requirements while retaining a desired level of stiffness, rigidity, and/or structural integrity. Bushings 362, 366 comprise rubber, polyurethane, or other materials configured to accommodate chassis torsional motion, while also dissipating vibration, and minimizing or reducing wear and tear of adjacent components.

Brackets 322, 324 and frame brackets 352, 354 of the second battery subassembly 320 are similar to brackets 312, 314 and frame brackets 342, 344, respectively, except that frame brackets 352, 354 attach to the outboard side of rail 204. Outward facing flanges of the brackets 322, 324 are supported by and secured to inward facing flanges of the frame brackets 352, 354, respectively. As with the first battery subassembly 300, bushings are disposed between and/or surrounding the flanges that are secured to each other. The flange direction at one or both ends of the flange can also be reversed from those described above.

Thus, the battery assembly 100, comprising the first and second battery subassemblies 300, 320, includes a plurality of securement portions/components to secure the battery assembly 100 to the chassis 200. In particular, battery assembly 100 is supported by and mounts to rails 202, 204 of chassis 200 at four locations—two locations on the fore/front side of the battery assembly 100 (e.g., via brackets 312, 322) and two locations on the aft/back side of the battery assembly 100 (e.g., via brackets 314, 324).

Figure 5A:
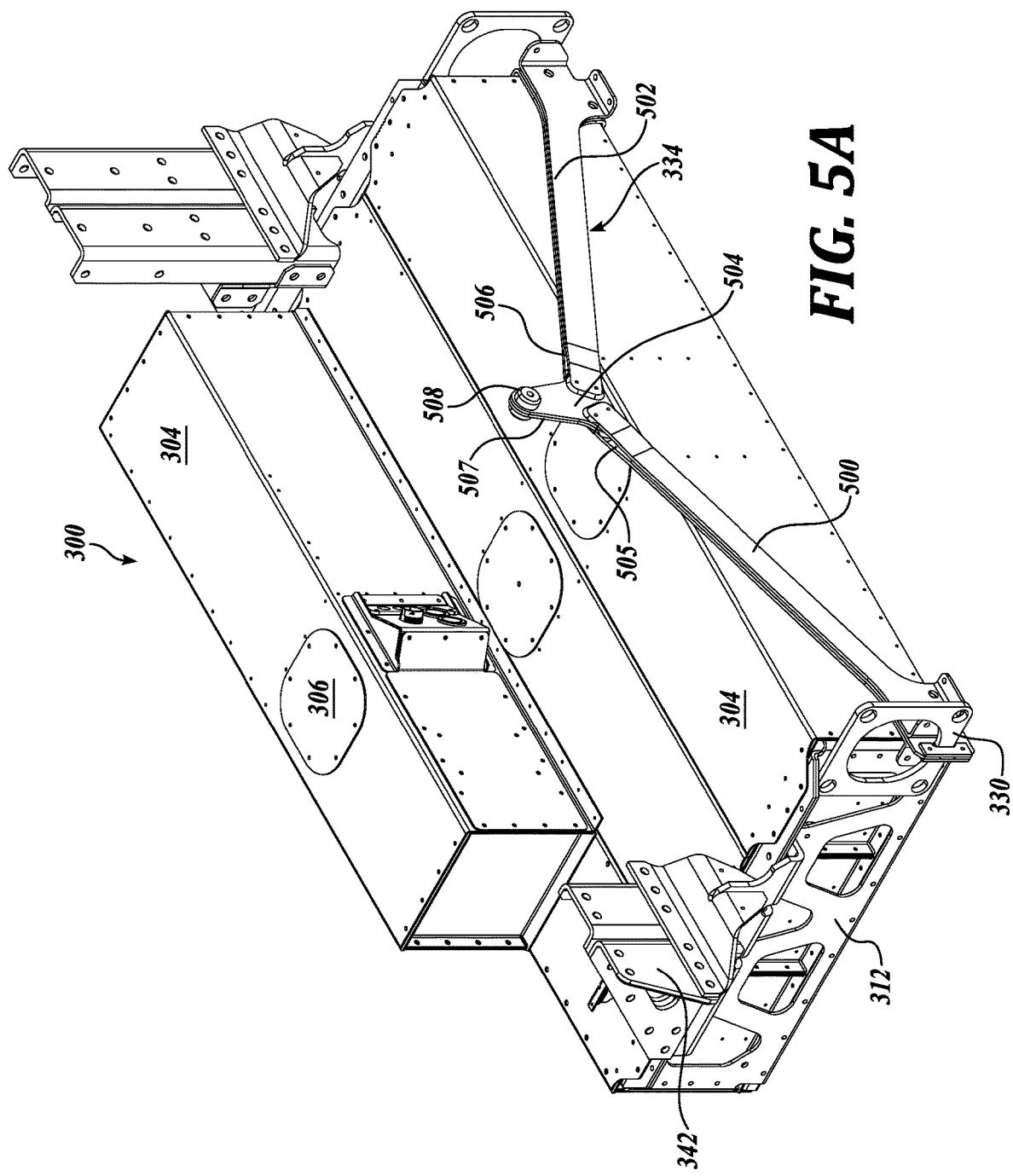
FIG. 5A depicts a perspective view of a portion of the battery assembly in accordance with some embodiments of the present disclosure.

FIG. 5A depicts a perspective view of a portion of the battery assembly 100, and in particular, hangers 334 and first battery subassembly 300 in accordance with some embodiments of the present disclosure. Hangers 334 are disposed adjacent to the inboard sides of the first and second battery subassemblies 300, 320 (e.g., the inboard side of the battery housing 304 closest to the center of the vehicle 100).

Hangers 334 comprise a pair of hangers—first and second hangers—associated with respective first and second battery subassemblies 300, 320. In some embodiments, each of the first and second hangers is configured substantially in an inverted V shape, and is identical in shape and size to each other. The first hanger comprises arms 505 and 506 and a central portion disclosed between the arms 505, 506. The first hanger attaches to the inboard side of the first battery subassembly 300. The ends of arms 505, 506 opposite to the ends closest to central portion 507 attaches to the inboard lower fore and aft corners, respectively, of the first battery subassembly 300. The central portion 507 attaches to a cross member of the chassis 200 via a bracket, as will be described below in connection with FIGS. 6A-6C. Likewise, the second hanger comprises arms 500 and 502 and a central portion 504 disposed between the arms 500, 502. The second hanger attaches to the inboard side of the second battery subassembly 320. The ends of arms 500, 502 opposite to the ends closest to central portion 504 attaches to the inboard lower fore and aft corners, respectively, of the second battery subassembly 320. The central portion 504 attaches to a cross member of the chassis 200 via a bracket, as will be described below in connection with FIGS. 6A-6C. The top portions of the central portions 504, 507 may be configured to attach to the bracket via a securing mechanism 508.

Thus, each of the first and second hangers permits the first and second battery subassemblies 300, 320 to move independently of each other, such as during chassis twist events. Each of the first and second hangers is configured to move independently of each other, such as independently pivot about a common axis at the center top so that the first and second battery subassemblies 300, 320 may also move independently of each to other. The first and second hangers are configured to at least reduce, isolate, damp, or absorb fore-aft movement of the battery assembly 106 while allowing the chassis 200 to twist along the length of the vehicle.

In some embodiments, a flexible material (also referred to as a wear plate) may be disposed between the first and second hangers. The flexible material, such as comprising high density polyethylene, facilitate in reducing rubbing forces between the subassemblies 300, 320.

Figure 5B:
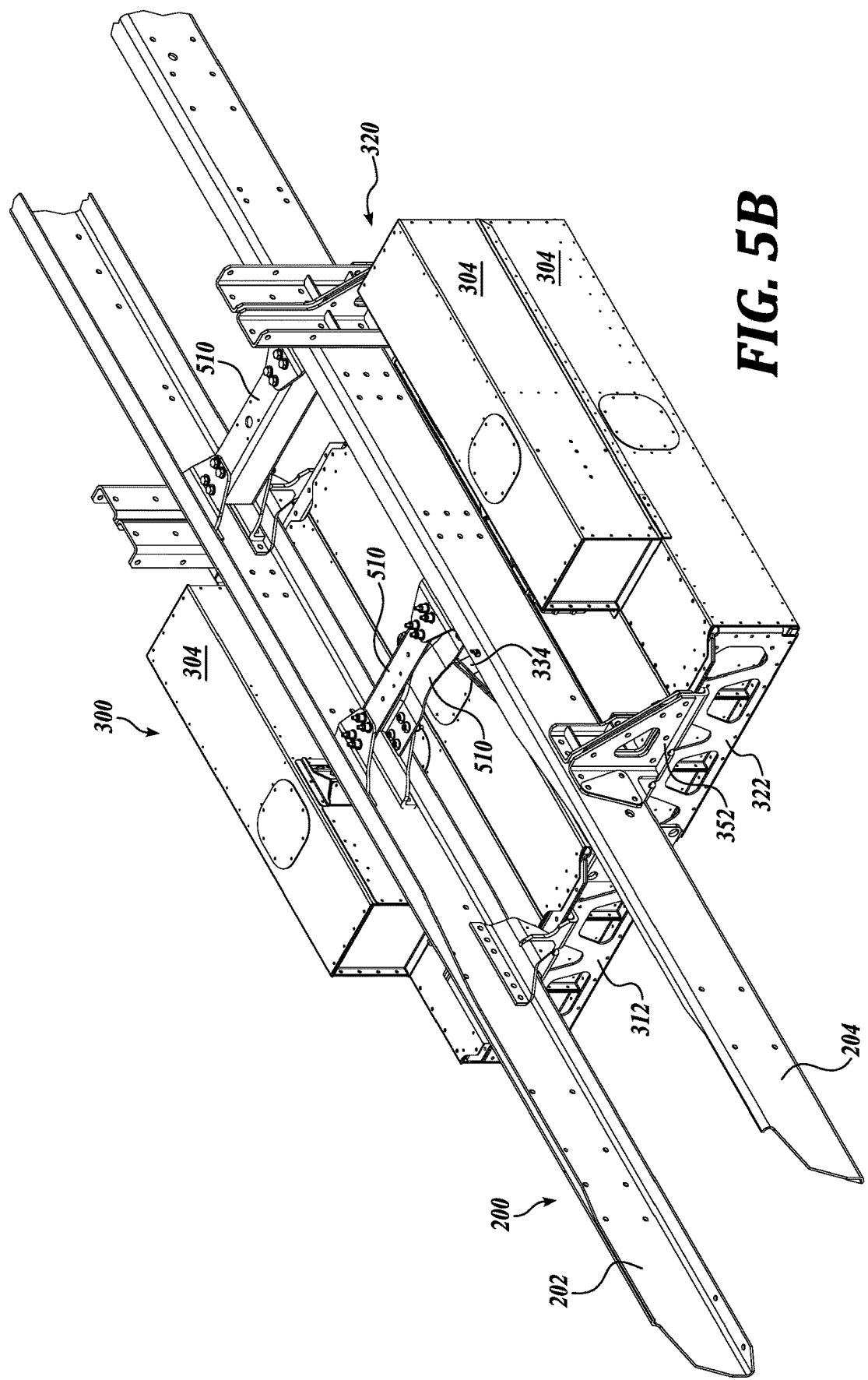
FIG. 5B depicts a perspective view of the first and second battery subassemblies in relation to chassis frame rails in accordance with some embodiments of the present disclosure.

FIG. 5B depicts a perspective view of the first and second battery subassemblies 300, 320 in relation to the rails 202, 204 in accordance with some embodiments of the present disclosure. In some embodiments, chassis 200 comprises the rails 202, 204 and a plurality of cross members 510 distributed along and extend perpendicularly between the rails 202, 204. Chassis 200 may thus also be referred to as a ladder frame. Hangers 334 are configured to be fastened to one of the cross members 510.

In some embodiments, the dimensions and contours of the first and second battery subassemblies 300, 320 are configured so as to fit or "wrap" around chassis 200. For instance, the distance between the inboard sides of the stacked battery housings 304 of the first and second battery subassemblies 300, 320 is slightly larger than the width of the chassis 200. The relative positions of the chassis 200 and first and second battery subassemblies 300, 320 are also such that a cross member 510 is aligned to be secured to the mounting bracket associated with the hangers 334. While the battery assembly 106 is shown mounted below the rails 202, 204 in FIG. 5B, in alternative embodiments, battery assembly 106 may be mounted co-planar with or higher than the rails 202, 204.

Figure 6B:
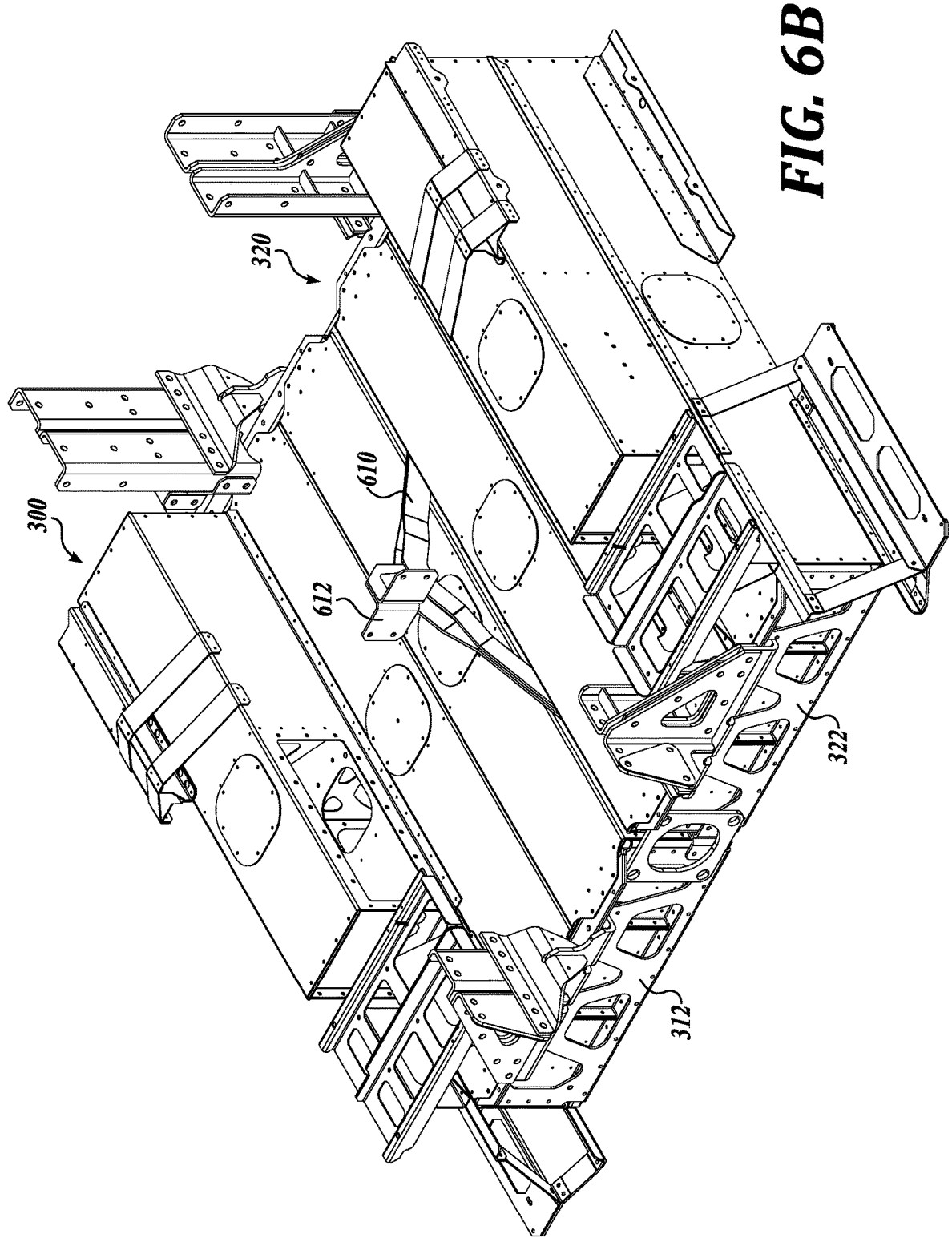

FIGS. 6A-6C depict perspective views of various mounting brackets associated with hangers in accordance with some embodiments of the present disclosure. FIG. 6A illustrates a mounting bracket 600 coupled to hangers 334 and also configured to attach to a cross member 510. Mounting bracket 600 aligns with and is secured to central portions 504, 507 of hangers 334 via, for example, a nut and bolt or other securing mechanisms. FIGS. 6B and 6C illustrate alternative mounting brackets 612, 622, each configured to attach to a cross member 510 and a pair of hangers. Each of hangers 610, 620 comprises two hangers, similar to the first and second hangers included in hangers 334. Although not shown, one or more bushings are included between and/or surrounding any of mounting brackets 600, 612, or 622 and the hangers near the attachment location to address undesirable movement, twisting, damage, wear and tear, and/or the like. Such bushings may provide isolation, damping, and/or absorption functions similar to those described above for bushings 364 or 366.

In some embodiments, first and second battery subassemblies 300, 320 are installed from opposite sides of the vehicle 100 and portions of the battery assembly 106 may be installed or assembled at different times relative to each other. For example, attachment of brackets 312, 314 to respective brackets 342, 344 is independent of attachment of brackets 322, 324 to respective brackets 352, 354. First and second hangers included in hangers 334, may be secured to one or both of the first and second battery subassemblies 300, 320 and then to the cross member 510. Alternatively, hangers may be attached to the cross member 510 and then the hangers may be attached to one or both of the first and second battery subassemblies 300, 320.

Referring to FIGS. 3A-3B, end links 330, 332 are configured to secure or "tie" the first and second battery subassemblies 300, 320 to each other (after hangers 334 are disposed between the first and second battery subassemblies 300, 320). Each of the end links 330, 332 comprises, for example, a square shaped ring, a square shaped disk with a center cutout, a square disk, a rectilinear shape, or the like. Each of the end links 330, 332 includes four securement locations (e.g., at or near the outer corners). End link 330 is located co-linear with brackets 312 and 322 and along the (imaginary) center line extending along the length of the vehicle 100. End link 330 is configured to attach to the inboard ends of the brackets 312 and 322. In FIG. 3A, end link 330 is shown connected to the upper and lower inboard ends of the brackets 312, 322 (e.g., a total of four securements) using securement mechanisms such as, but not limited to, nuts and bolts, screws, or the like.

End link 332 is similar to end link 330 except end link 332 is associated with brackets 314 and 324. End link 332 is configured to connect to the upper and lower inboard ends of brackets 314, 324 using securement mechanisms such as, but not limited to, nuts and bolts, screws, or the like (see FIG. 3B). One or more bushings is included at the securement locations between and/or surrounding end link 330 and brackets 312, 322 and also between and/or surrounding end link 332 and brackets 314, 324. The bushings provide additional resistance to movements, twists, side to side rocking, or the like originating from the chassis 200 from propagating to the batteries.

In some embodiments, hangers 334 and end links 330, 332 comprise materials similar to brackets 312, 314, 322, 324. The bushings associated with the hangers 334 and end links 330, 332 also comprise materials similar to bushings 362, 366. Chassis 200 comprises a structural material such as, but not limited to, steel, carbon fiber, materials having a stiffness or rigidity in the range of 200 GPa, or the like.

In this manner, brackets 312, 14, 322, 324, end links 330, 332, and hangers 334 comprise a support structure for the component to be included in the vehicle 100; in this case, the plurality of batteries 400 located within the battery housings 304. Such support structure is configured to provide, without limitation, the following functionalities: hold or contain the component to the vehicle 100; provide mechanism(s) to secure the component to the chassis 200; and reduce, isolate, or prevent movement, twisting, side to side movement, front to back movement, back to front movement, up or down movement, combination movement, low frequency resonance modes, and/or the like associated with the chassis 200 by maintaining/providing the component at a greater stiffness/rigidity than the chassis 200. It is desirable for the component support structure to have a stiffness that results in the structure having a first natural mode of vibration above 20 Hertz (Hz), which places the first natural mode of vibration associated with the structure above the typical input excitation frequencies associated with the vehicle suspension, such as the axle hop and tramp, and the chassis bounce modes, which typically occur in the range of 6 to 15 Hz.

It is contemplated that the battery assembly 106 may be partially or fully pre-assembled and then mounted to the chassis 200. Moreover, the coupling associated with one or more of brackets 312, 14, 322, 324, end links 330, 332, or hangers 334 may comprise a selectively attachable/detachable mechanism (e.g., bolts, screws, etc.) or a permanent (or semi-permanent) attachment mechanism (e.g., glue, weld, etc.).

FIGS. 6B-6D depict alternative embodiments of the hangers 334, according to some embodiments of the present disclosure. In FIG. 6B, hangers 610 comprise two hangers having a different shape than first and second hangers of hangers 334. Each arm of the two hangers comprising hangers 610 may be non-linear in comparison to any of arms 500, 502, 505, or 506 and include a bend along its length. In some embodiments, central portions, such as central portions 504, 507 of hangers 334, may be omitted for hangers 610. In FIG. 6C, hangers 620 comprise two hangers attached to subassemblies 300, 320 at different locations from attachment of the first and second hangers of hangers 334. FIG. 6C shows hangers 620 having a smaller angle between its arms than hangers 334 or 610. The arm ends of hangers 620 may thus attach to the inboard sides of the first and second battery subassemblies 300, 320 inward of the inboard lower fore and aft corners. FIG. 6D shows hangers 630 also comprising two hangers, but having a smaller angle between its arms and excluding central portions in comparison to the hangers 620. Mounting brackets 600, 612, and/or 622 may be used in combination with different hangers than shown in FIGS. 6A-6C.

In alternative embodiments, any of hangers 334, 610, 620, or 630 may comprise a single hanger (rather than two hangers) with bushings disposed between the single hanger and each of the subassemblies 300, 320 to allow the subassemblies 330, 320 to move independently of each other.

In other embodiments, first and second battery subassemblies 300, 320 can be included in a parallel hybrid configured vehicle. In a parallel hybrid configuration, the drive shaft (e.g., drive shaft 112 of FIG. 1) of the vehicle can be directly and indirectly driven by the vehicle's power source (e.g., ICE). A mechanical coupling may exist between the power source and drive shaft for the power source to directly drive the drive shaft, and an electrical coupling may also exist between the power source and the drive shaft via a generator/motor and batteries. The mechanical coupling between the power source and drive shaft may comprise at least a drive train that extends between (or substantially between) the power source and the drive shaft connected to a rear axle that drives the rear wheels.

Figure 7A:
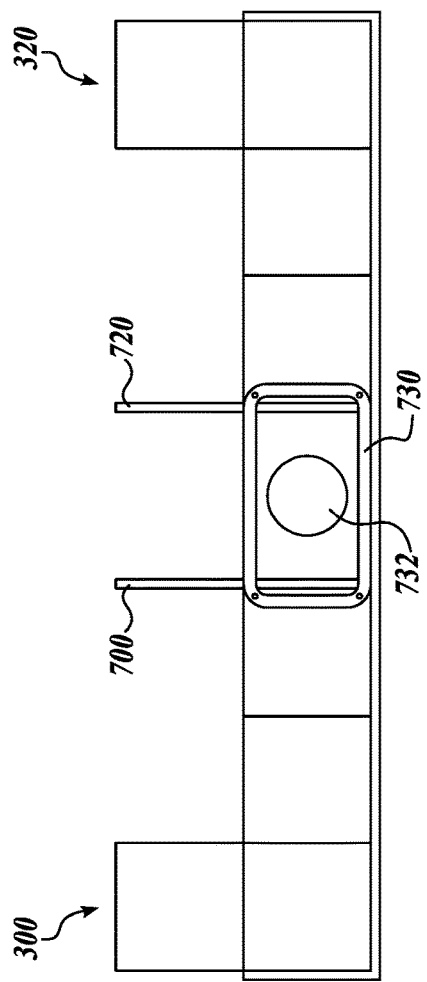
FIGS. 7A-7B depict battery assemblies implemented in vehicles including a drive train in accordance with some embodiments of the present disclosure.
Figure 7B:
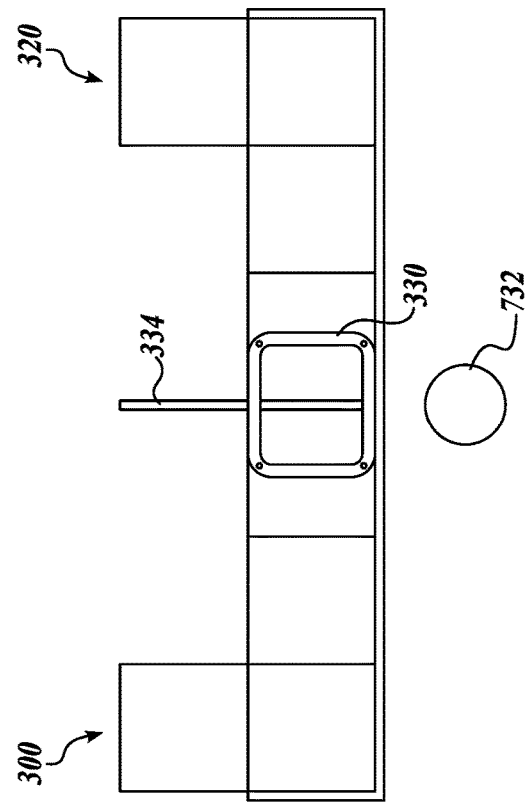

FIGS. 7A-7B depict block diagram partial front views of a battery assembly included in a vehicle implemented in a parallel hybrid configuration, according to some embodiments of the present disclosure. A battery assembly similar to battery assembly 106 may be implemented except as follows. In FIG. 7A, the battery assembly comprises first and second battery subassemblies 300, 320 mounted to respective rails of a chassis (e.g., rails 202, 204), hangers 700, 720, first end link 730, and second end link (not shown) similar to first end link 730. First and second battery subassemblies 300, 320 are separated from each other by a gap that is greater than a width of a drive train 732. First end link 730, located on a fore/front side of subassemblies 300, 320, and second end link, located on an aft/back side of subassemblies 300, 320, are co-linear with each other. First end link 730 and the second end link are similar to respective end links 330, 332 except the width of first and second end links are large enough for drive train 732 to pass through the center cutouts or openings of the first and second end links. Accordingly, first and second end links may comprise rectangular shaped rings. Hangers 700, 720 may attach to one or more cross members of the chassis and respective inbound sides of first and second battery subassemblies 300, 320 via mounting brackets.

In other embodiments, a battery assembly comprising first and second battery subassemblies 300, 320, hangers 334 (with associated mounting bracket), and end links 330, 332 may be mounted to a chassis above the drive train 732. The cab of the vehicle may be raised higher relative to the cab location in vehicle 100 so as to provide sufficient space for the battery assembly above the drive train 732.

In still other embodiments, drive train 732 may be located above the battery assembly. In such a configuration, the first and second hangers of hangers 334 may be configured in a Y shape (with respect to a front view of the vehicle) with the drive train 732 disposed between the two upper legs of the "Y."

Figure 8:
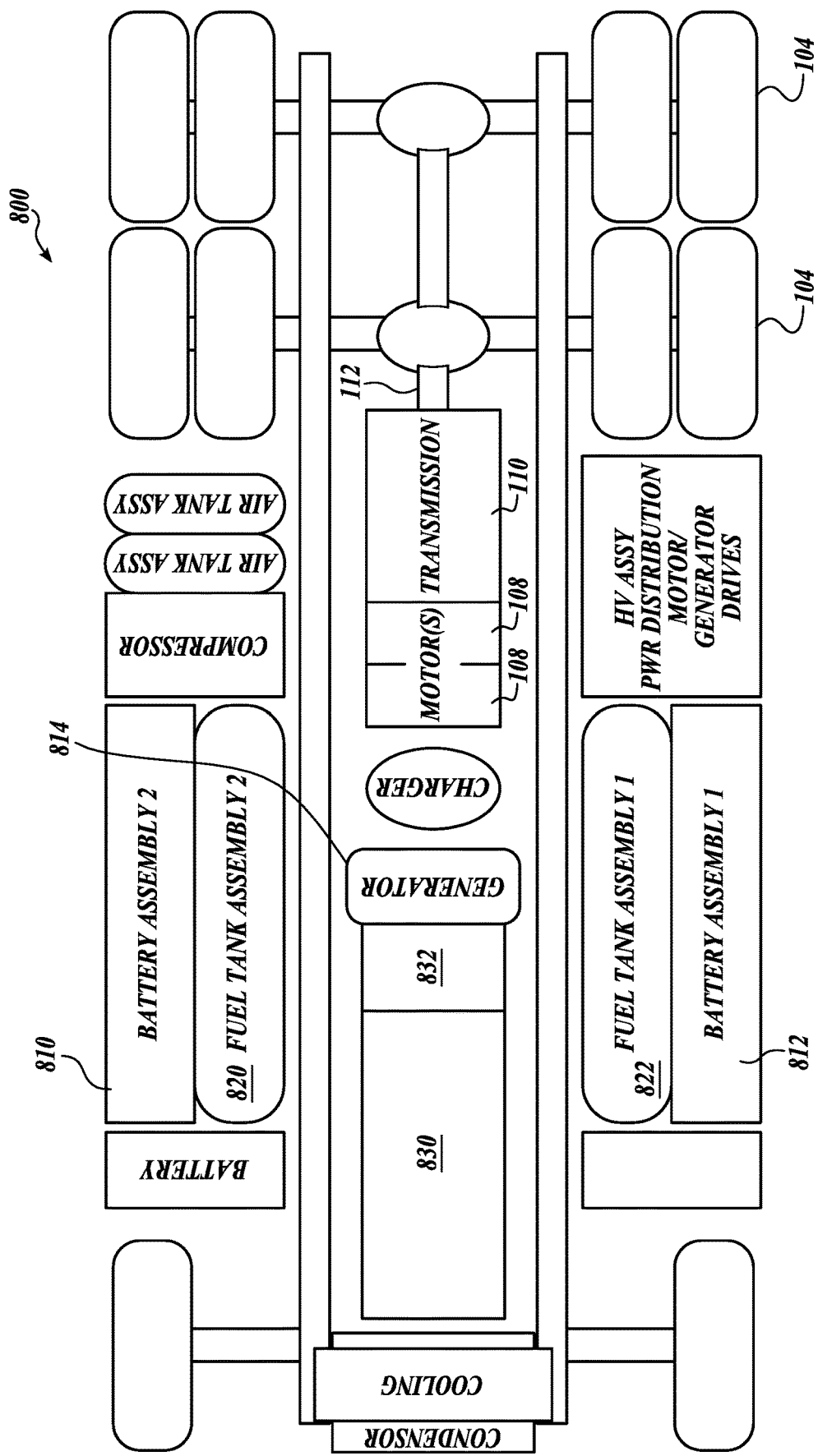
FIG. 8 depicts an example block diagram of components included in a vehicle located or positioned in a modular implementation in accordance with some embodiments of the present disclosure.

FIG. 8 depicts an example block diagram of components included in a vehicle 800 located or positioned in a modular implementation in accordance with some embodiments of the present disclosure. In a modular implementation, spaces for specific components of the vehicle 800 are pre-designated or reserved so that the same pre-designated spaces for specific components can be used for different configurations of the vehicle 800, such as vehicle 800 implemented in a serial hybrid configuration, parallel hybrid configuration, electric configuration, or the like. As an example, if vehicle 800 is designed to be a serial hybrid vehicle with ICE 830 as the power source, then spaces 820, 822 reserved for the fuel tank assemblies 1, 2 (e.g., for fuel cells) may be used to locate more rechargeable batteries in addition to the rechargeable battery space 810, 812 already reserved for battery assemblies 1, 2. Spaces 810, 812, 820, 822 may comprise the locations at which the outboard portions of the battery assembly 106 may be disposed. Components such as ICE 830, gearbox 832, and generator 814 may be disposed above the battery assembly 106.

In alternative embodiments, battery assembly 106 may be implemented in vehicle 100 configured as an (all) electric vehicle. In this case, components such as ICE or fuel cells may be omitted and additional batteries may be located at those locations, if, for example, longer driving range is desired.

Although battery assemblies having a higher stiffness/rigidity than the chassis it is mounted on are described, component assemblies which may benefit from the support structures described herein are not limited to batteries. In some embodiments, any of a variety of substantially large components and/or rigid component assemblies that requires and/or would benefit from not being subject to chassis movements or twists can be mounted to the vehicle using brackets 312, 314, 322, 324, hangers 334 (with associated mounting bracket), and/or end links 330, 332. A substantially large component comprises a component that extends across the width of approximately all of the chassis or across approximately the width of the vehicle. As the size of an assembly increases, so does the relative displacement of the mounting features and the loads that such displacement induces on the assembly. If an assembly size approaches the width of the vehicle or chassis, significant isolation between the assembly and the chassis frame is beneficial to the longevity, performance, and/or safe operation of the component included in the assembly. Examples of other rigid component assemblies include, without limitation, a high pressure tank assembly, large electronic modules assembly, fuel cells, or the like.

Illustrative examples of the apparatuses and systems of various embodiments disclosed herein are provided below. An embodiment of the apparatus or system may include any one or more, and any combination of, the examples described below.

1. A component assembly of a vehicle having a chassis, comprising:
a component configured to extend substantially across a width of the vehicle, wherein the chassis is configured to be flexible in the presence of a torsion force; and
a support structure including a plurality of brackets, wherein each bracket of the plurality of brackets is configured to hold the component and secure the component to the chassis, wherein the support structure is configured to maintain the component at a higher rigidity than the chassis in the presence of the torsion force.

2. The component assembly of claim 1, wherein each bracket of the plurality of brackets includes an outward or inward facing flange at a first end, configured to couple to a respective inward or outward facing flange attached to a rail of the chassis, and a respective inward or outward facing flange at a second end opposite to the first end, configured to hold the component.

3. The component assembly of any of clauses 1-2, wherein the support structure includes one or more hangers located proximate to a center of the component, wherein the one or more hangers is configured to attach to a cross member of the chassis.

4. The component assembly of any of clauses 1-3, wherein the one or more hangers comprises first and second hangers, the first hanger attached to a first portion of the component and the second hanger attached to a second portion of the component, and wherein the first and second hangers are configured to facilitate independent movement of the first and second portions of the component relative to each other.

5. The component assembly of any of clauses 1-4, wherein the support structure includes a plurality of end links, wherein each end link of the plurality end links is co-linear with and attaches to ends of a pair of brackets of the plurality of brackets.

6. The component assembly of any of clauses 1-5, wherein the vehicle comprises a serial hybrid vehicle, a parallel hybrid vehicle, or an electric vehicle.

7. The component assembly of any of clauses 1-6, wherein the component assembly is disposed co-planar with or below the chassis.

8. The component assembly of any of clauses 1-7, wherein the vehicle comprises a Class 6-8 vehicle, a truck, or a commercial vehicle.

9. The component assembly of any of clauses 1-8, wherein the component comprises a plurality of batteries configured to store electrical energy to power a drive shaft of the vehicle, a high pressure tank, an electronic module, fuel cells, or a component assembly to be at a higher rigidity than the chassis.

10. The component assembly of any of clauses 1-9, wherein the component comprises first and second portions and the support structure comprises first and second support structures, and wherein the first support structure is configured to hold the first portion and secure the first portion to the chassis and the second support structure is configured to hold the second portion and secure the second portion to the chassis.

11. The component assembly of any of clauses 1-10, wherein a first bracket of the plurality of brackets is disposed on a side of the component adjacent a front of the vehicle and a second bracket of the plurality of brackets is disposed on a side of the component adjacent a back of the vehicle.

12. A hybrid or electric truck, comprising:
a chassis including first and second rails and a plurality of cross members extending between the first and second rails;
a component including first and second portions, wherein the component extends substantially across a width of the truck; and
a support structure including first, second, and third support structures, wherein the first support structure is configured to support the first portion and attach to the first rail, the second support structure is configured to support the second portion and attach to the second rail, and the third support structure is attached to a cross member of the plurality of cross members and at least one of the first or second portions.

13. The truck of claim 12, wherein each of the first and second support structures includes an outward/inward facing flange at a first end, configured to couple to an inward/outward facing flange attached to respective first and second rails of the chassis, and an inward/outward facing flange at a second end opposite to the first end, configured to hold the first and second portions, respectively.

14. The truck of any of clauses 12-13, wherein the third support structure is located between inboard sides of the first and second portions, and further comprising a mounting bracket disposed between the first support structure and the cross member of the plurality of cross members.

15. The truck of any of clauses 12-14, wherein the first support structure comprises first and second brackets, wherein the support structure includes a fourth support structure, and wherein the fourth support structure is co-linear with and attaches to ends of the first and second brackets.

16. The truck of any of clauses 12-15, wherein the truck comprises a serial hybrid truck, a parallel hybrid truck, or an electric truck.

17. The truck of clause 12, wherein the truck comprises a Class 6-8 vehicle or a commercial vehicle.

18. The truck of any of clauses 12-16, wherein the component comprises a plurality of batteries configured to store electrical energy to power a drive shaft of the truck, a high pressure tank, an electronic module, fuel cells, or a component assembly to be at a higher rigidity than the chassis.

19. The truck of any of clauses 12-17, wherein the first support structure is disposed on a side of the component adjacent a front of the truck and the second support structure is disposed on a side of the component adjacent a back of the truck.

20. The truck of any of clauses 12-19, wherein the support structure is configured to maintain the component at a higher rigidity than the chassis subject to a torsion force.

The above description of illustrated embodiments of the claimed subject matter, including what is described in the Abstract, is not intended to be exhaustive or to limit the claimed subject matter to the precise forms disclosed. While specific embodiments of, and examples for, the claimed subject matter are described herein for illustrative purposes, various modifications are possible within the scope of the claimed subject matter, as those skilled in the relevant art will recognize.

These modifications can be made to the claimed subject matter in light of the above detailed description. The terms used in the following claims should not be construed to limit the claimed subject matter to the specific embodiments disclosed in the specification. Rather, the scope of the claimed subject matter is to be determined entirely by the following claims, which are to be construed in accordance with established doctrines of claim interpretation.

What is claimed is:

1. A component assembly of a vehicle having a chassis, comprising:
    a component configured to extend substantially across a width of the vehicle, wherein the chassis is configured to be flexible in the presence of a torsion force; and
    a support structure including a plurality of brackets, wherein each bracket of the plurality of brackets is configured to hold the component and secure the component to the chassis, wherein the support structure is configured to maintain the component at a higher rigidity than the chassis in the presence of the torsion force.

2. The component assembly of claim 1, wherein each bracket of the plurality of brackets includes an outward or inward facing flange at a first end, configured to couple to a respective inward or outward facing flange attached to a rail of the chassis, and a respective inward or outward facing flange at a second end opposite to the first end, configured to hold the component.

3. The component assembly of claim 1, wherein the support structure includes one or more hangers located proximate to a center of the component, wherein the one or more hangers is configured to attach to a cross member of the chassis.

4. The component assembly of claim 3, wherein the one or more hangers comprises first and second hangers, the first hanger attached to a first portion of the component and the second hanger attached to a second portion of the component, and wherein the first and second hangers are configured to facilitate independent movement of the first and second portions of the component relative to each other.

5. The component assembly of claim 1, wherein the support structure includes a plurality of end links, wherein each end link of the plurality end links is co-linear with and attaches to ends of a pair of brackets of the plurality of brackets.

6. The component assembly of claim 1, wherein the vehicle comprises a serial hybrid vehicle, or a parallel hybrid vehicle, or an electric vehicle.

7. The component assembly of claim 1, wherein the component assembly is disposed co-planar with or below the chassis.

8. The component assembly of claim 1, wherein the vehicle comprises a Class 6-8 vehicle, or a truck, or a commercial vehicle.

9. The component assembly of claim 1, wherein the component comprises a plurality of batteries configured to store electrical energy to power a drive shaft of the vehicle, or a high pressure tank, or an electronic module, or fuel cells, or a component assembly to be at a higher rigidity than the chassis.

10. The component assembly of claim 1, wherein the component comprises first and second portions and the support structure comprises first and second support structures, and wherein the first support structure is configured to hold the first portion and secure the first portion to the chassis and the second support structure is configured to hold the second portion and secure the second portion to the chassis.

11. The component assembly of claim 1, wherein a first bracket of the plurality of brackets is disposed on a side of the component adjacent a front of the vehicle and a second bracket of the plurality of brackets is disposed on a side of the component adjacent to a side of the vehicle opposite to the front of the vehicle.

12. A hybrid or electric truck, comprising:
    a chassis including first and second rails and a plurality of cross members extending between the first and second rails;
    a component including first and second portions, wherein the component extends substantially across a width of the truck; and
    a support structure including first, second, and third support structures, wherein the first support structure is configured to support the first portion and attach to the first rail, the second support structure is configured to support the second portion and attach to the second rail, and the third support structure is attached to a cross member of the plurality of cross members and at least one of the first or second portions.

13. The truck of claim 12, wherein each of the first and second support structures includes an outward/inward facing flange at a first end, configured to couple to an inward/outward facing flange attached to respective first and second rails of the chassis, and an inward/outward facing flange at a second end opposite to the first end, configured to hold the first and second portions, respectively.

14. The truck of claim 12, wherein the third support structure is located between inboard sides of the first and second portions, and further comprising a mounting bracket disposed between the first support structure and the cross member of the plurality of cross members.

15. The truck of claim 12, wherein the first support structure comprises first and second brackets, wherein the support structure includes a fourth support structure, and wherein the fourth support structure is co-linear with and attaches to ends of the first and second brackets.

16. The truck of claim 12, wherein the truck comprises a serial hybrid truck, or a parallel hybrid truck, or an electric truck.

17. The truck of claim 12, wherein the truck comprises a Class 6-8 vehicle or a commercial vehicle.

18. The truck of claim 12, wherein the component comprises a plurality of batteries configured to store electrical energy to power a drive shaft of the truck, or a high pressure tank, or an electronic module, or fuel cells, or a component assembly to be at a higher rigidity than the chassis.

19. The truck of claim 12, wherein the first support structure is disposed on a side of the component adjacent a front of the truck and the second support structure is disposed on a side of the component adjacent to a side of the truck opposite to the front of the truck.

20. The truck of claim 12, wherein the support structure is configured to maintain the component at a higher rigidity than the chassis subject to a torsion force.

* * * * *